(12) United States Patent
Marchio et al.

(10) Patent No.: US 8,833,724 B2
(45) Date of Patent: Sep. 16, 2014

(54) RADIATION SHIELD SUPPORT SYSTEM AND METHOD

(76) Inventors: Michael J. Marchio, Joliet, IL (US); Gregory J. Smith, Joliet, IL (US)

(*) Notice: Subject to any disclaimer, the term of this patent is extended or adjusted under 35 U.S.C. 154(b) by 319 days.

(21) Appl. No.: 13/269,440

(22) Filed: Oct. 7, 2011

(65) Prior Publication Data

US 2012/0151739 A1  Jun. 21, 2012

Related U.S. Application Data

(60) Provisional application No. 61/423,581, filed on Dec. 15, 2010.

(51) Int. Cl.
  *G21F 3/00* (2006.01)
  *F16P 1/02* (2006.01)
(52) U.S. Cl.
  CPC ........................................ *F16P 1/02* (2013.01)
  USPC ........................................ 248/637; 250/515.1
(58) Field of Classification Search
  USPC ......... 248/637, 672; 250/515.1, 517.1, 519.1, 250/505.1
  See application file for complete search history.

(56) References Cited

U.S. PATENT DOCUMENTS

| | | | | |
|---|---|---|---|---|
| 5,929,458 A | * | 7/1999 | Nemezawa et al. | 250/519.1 |
| 6,835,945 B2 | * | 12/2004 | Mossor et al. | 250/515.1 |
| 2008/0197302 A1 | * | 8/2008 | Fago et al. | 250/506.1 |
| 2009/0020713 A1 | * | 1/2009 | Baudro | 250/517.1 |
| 2012/0241652 A1 | * | 9/2012 | Jeschke | 250/519.1 |

* cited by examiner

*Primary Examiner* — Steven Marsh
(74) *Attorney, Agent, or Firm* — The Thompson Law Office, P.C.; Lawrence E. Thompson

(57) ABSTRACT

Disclosed herein is new and improved system and method for supporting radiation shields. The system may include a first frame subassembly, a second frame assembly, and a quick disconnect. The first frame sub assembly may include an upper partial ring support, a lower partial ring support, and a plurality of vertical supports. The second frame sub assembly may include an upper partial ring support, a lower partial ring support, and a plurality of vertical supports. The second frame subassembly may have a ring hole. The quick disconnect may include a plug and a bolt. The plug may be permanently affixed to the first frame subassembly, and the bolt may be configured to pass through the ring hole and the plug hole in order to removably secure the first frame subassembly to the second frame subassembly.

4 Claims, 8 Drawing Sheets

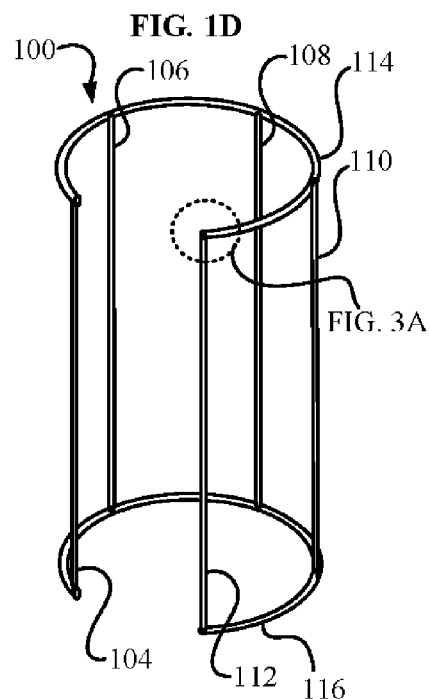
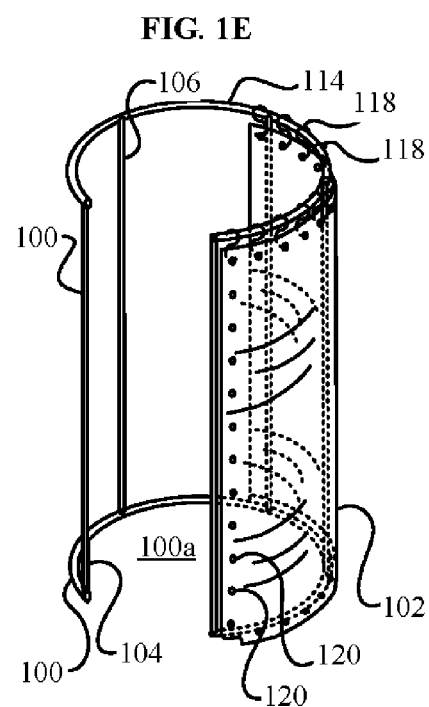
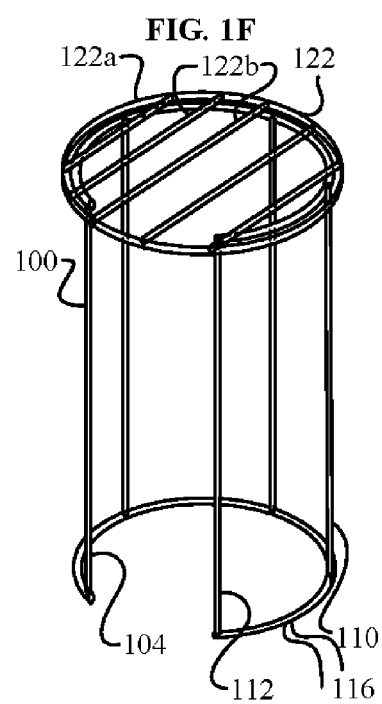

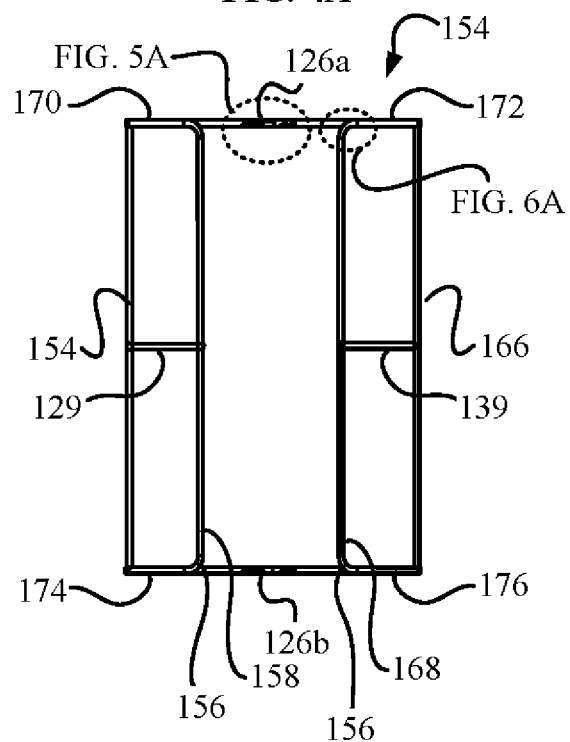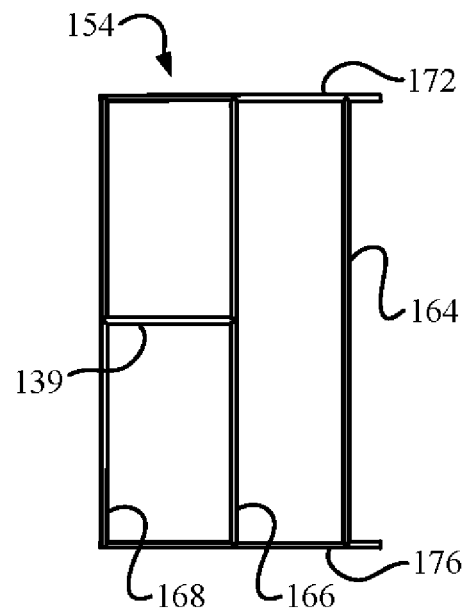

RADIATION SHIELD SUPPORT SYSTEM AND METHOD

CROSS-REFERENCE TO RELATED APPLICATION

This application claims the benefit of U.S. Provisional Application No. 61/423,581, filed Dec. 15, 2010.

BACKGROUND

1. Field

This invention is generally related to radiation protection, and more particularly, to portable systems and methods for supporting radiation shields, such as lead radiation shields.

2. Background

Workers in some fields, such as the nuclear power industry, may be exposed to radiation hazards. In the past, workers might use scaffolding or other cumbersome means for supporting radiation shields to form a reduced radiation area within a higher radiation environment, or to protect the workers from a radiation emitting source. However, the systems used in the past are cumbersome to assemble, more likely to leave gaps where radiation may reach the workers, and/or are only minimally portable.

Prior attempts to address such problems include: U.S. Pat. No. 6,835,945 entitled "Portable Shielding System," issued to Mossor, et al., on Dec. 28, 2004; U.S. Pat. No. 5,929,458 entitled "Radiation Shield," issued to Nemezawa, et al., on Jul. 27, 1999; and U.S. Pat. No. 4,400,623 entitled "Radiation Attenuation System," issued to Jacobson, on Aug. 23, 1983 (all of which are incorporated herein by reference).

Although the problems described are not uncommon, the previous solutions that have been tried have failed to provide a convenient system and method for supporting radiation shields and for creating reduced radiation areas. It is therefore desirable to provide new and improved radiation support systems and methods.

SUMMARY

Disclosed herein is a new and improved system and method for supporting radiation shields. In accordance with an aspect of the invention, a radiation shield support system may include a first frame subassembly, a second frame assembly, and a quick disconnect. The first frame sub assembly may include an upper partial ring support, a lower partial ring support, and a plurality of vertical supports. The second frame sub assembly may include an upper partial ring support, a lower partial ring support, and a plurality of vertical supports. The second frame subassembly may have a ring hole. The quick disconnect may include a plug and a bolt. The plug may be permanently affixed to the first frame subassembly, and the bolt may be configured to pass through the ring hole and the plug hole in order to removably secure the first frame subassembly to the second frame subassembly.

In a further embodiment, a radiation shield support system may include a first frame subassembly, a second frame assembly, and a means for removably securing the first frame subassembly to the second frame subassembly, wherein the means for removably securing the first frame subassembly to the second frame subassembly may be one or more of the quick disconnect systems.

An embodiment of the method of supporting one or more radiation shields may include the steps of placing a first frame subassembly around an area in which reduced radiation exposure is desired, placing a second frame subassembly around the area in which reduced radiation exposure is desired, and removably securing the first frame subassembly to the second frame subassembly.

Other systems, methods, aspects, features, embodiments and advantages of the system and method for supporting radiation shields disclosed herein will be, or will become, apparent to one having ordinary skill in the art upon examination of the following drawings and detailed description. It is intended that all such additional systems, methods, aspects, features, embodiments and advantages be included within this description, and be within the scope of the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the system disclosed herein. In the figures, like reference numerals designate corresponding parts throughout the different views.

FIG. 1D is a perspective view of the radiation shield support system of FIG. 1A.

FIG. 1E is a perspective view of the radiation shield support system of FIG. 1A showing a radiation shield hanging from the support system.

FIG. 1F is a perspective view of the radiation shield support system of FIG. 1A that also shows a cover portion of the support system.

FIG. 4A is a front view of a third embodiment of the radiation shield support system that includes the quick disconnect system and a plurality of rounded corner connectors.

FIG. 4B is a side view of the radiation shield support system of FIG. 4A.

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

Figure 1A:
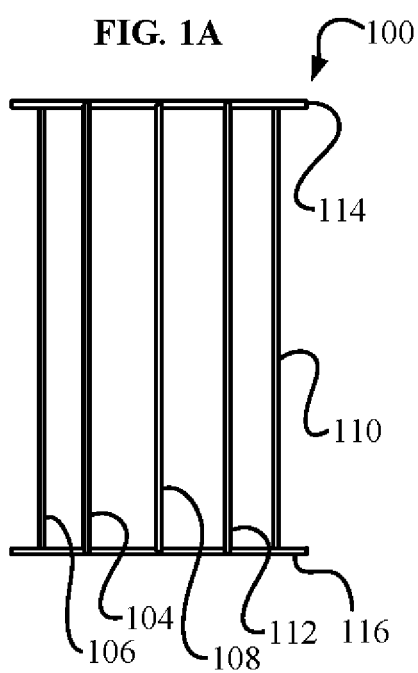
FIG. 1A is a front view of one embodiment of the radiation shield support system, including a plurality of squared corner connectors.

FIG. 1A is a front view of one embodiment of the radiation shield support system 100. The radiation shield support system 100 may be used for supporting one or more radiation shields 102 (see FIG. 1E). The system 100 may include a plurality of vertical supports, such as a first vertical support 104, a second vertical support 106, a third vertical support 108, a fourth vertical support 110, and a fifth vertical support 112. The system 100 may also include an upper partial ring support 114 and a lower partial ring support 116.

Figure 1B:
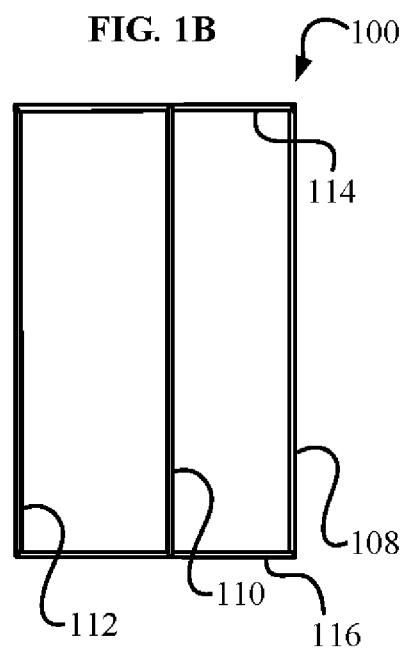
FIG. 1B is a side view of the radiation shield support system of FIG. 1A.
Figure 1C:
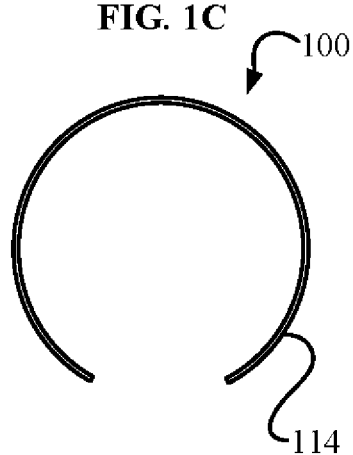
FIG. 1C is a top view of the radiation shield support system of FIG. 1A.

FIG. 1B is a side view of the radiation shield support system 100 of FIG. 1A. FIG. 1C is a top view of the radiation shield support system 100 of FIG. 1A. FIG. 1D is a perspective view of the radiation shield support system 100 of FIG. 1A.

FIG. 1E is a perspective view of the radiation shield support system 100 of FIG. 1A showing the exemplary radiation shield 102 hanging from the radiation shield support system 100. Radiation shield 102 may be supported in a number of manners, for example but not limited to, by being draped (not shown) over a portion of the radiation shield support system 100 such as the upper partial ring support 114. Radiation shield 102 may also be hung, for example but not limited to, by a plurality of S-hooks 118 that may be hung from the upper partial ring support 114 and inserted into a plurality of grommets 120 in the radiation shield 102. Radiation shield 102 may also be hung, for example but not limited to, by a plurality of plastic ties (not shown) that may be hung from the upper partial ring support 114 and inserted into the grommets 120 in the radiation shield 102. Providing one or more radiation shields, such as radiation shield 102, and supporting the one or more radiation shields from radiation shield support system 100 (or other embodiments described herein) may create a space 100a having reduced radiation exposure within a higher radiation environment.

Radiation shield 102 may be a variety of devices, such as blankets, for example lead blankets, that are known to those having skill in the art. Examples of such radiation shields include those offered by: Nuclear Power Outfitters of Lisle, Ill. and shown at http://www.alarasolutions.com/shielding/leadSpecs.html; Lancs Industries of Kirkland Wash. and shown at http://www.lancsindustries.com/lead-wool-blankets/; and MarShield of Ontario, Canada and shown at http://www.marshield.com/nuclear-shielding/leaded-blankets-curtains (all accessed on Sep. 6, 2011). The grommets 120 may be placed, and spaced, about the shield 102 to facilitate hanging the shield 102 from a structure. Radiation shields 102 may typically weigh 10-15 pounds per square foot.

FIG. 1F is a perspective view of the radiation shield support system of FIG. 1A that also shows a cover portion 122 of the support system 100. Cover portion 122 may facilitate the draping (not shown) of radiation shields, such as radiation shield 102, over the top of the support system 100. Cover portion may include a circular portion 122a and a plurality of slats 122b. Circular portion 122a may be constructed form a variety of materials, such as but not limited to, 2 inch×⅜ inch aluminum. The plurality of slats may be constructed from a variety of materials, such as but not limited to, 1 inch×⅜ inch aluminum.

Figure 2A:
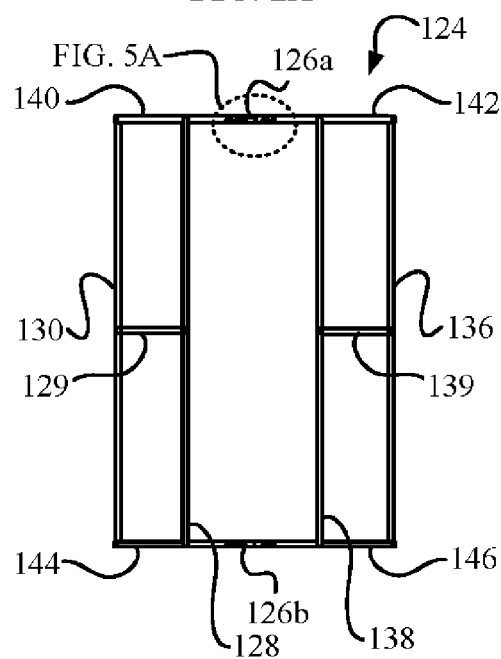
FIG. 2A is a front view of a second embodiment of the radiation shield support system that includes a quick disconnect system.

FIG. 2A is a front view of a second embodiment of a radiation shield support system 124 that includes a plurality of quick disconnect systems, such as quick disconnect system 126a and 126b. The radiation support system 124 may be used for supporting one or more radiation shields 102 (see FIG. 1E). The system 124 may include a plurality of vertical supports, such as a first vertical support 128, a second vertical support 130, a third vertical support 132 (see FIG. 2D), a fourth vertical support 134 (see FIG. 2D), a fifth vertical support 136, and a sixth vertical support 138. The system 124 may also include a first portion of an upper partial ring support 140, a second portion of an upper partial ring support 142, a first portion of a lower partial ring support 144, and a second portion of a lower partial ring support 146. The system 124 may also include a first mid-horizontal support 129 and a second mid-horizontal support 139.

Figure 2B:
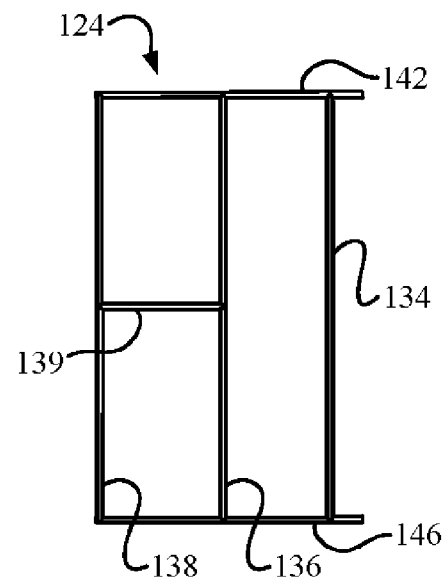
FIG. 2B is a side view of the radiation shield support system of FIG. 2A.
Figure 2C:
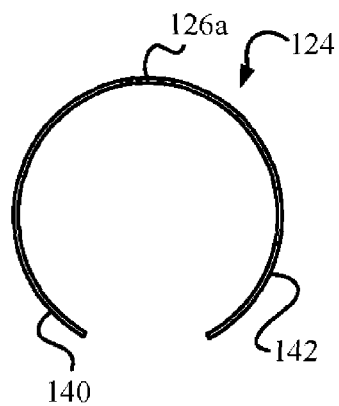
FIG. 2C is a top view of the radiation shield support system of FIG. 2A.
Figure 2D:
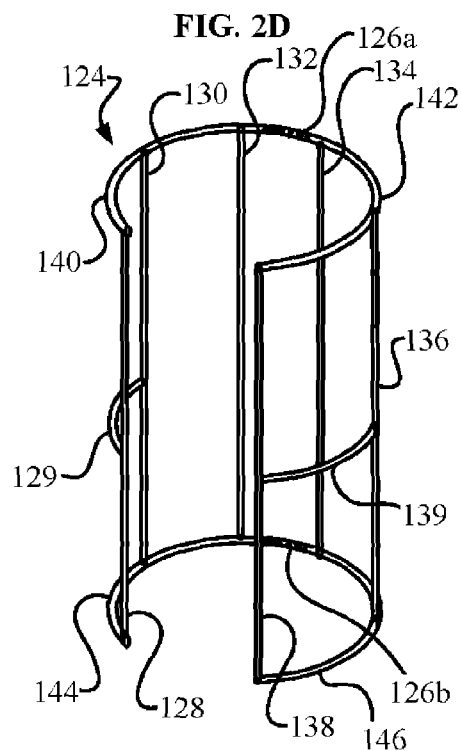
FIG. 2D is a perspective view of the radiation shield support system of FIG. 2A.
Figure 2E:
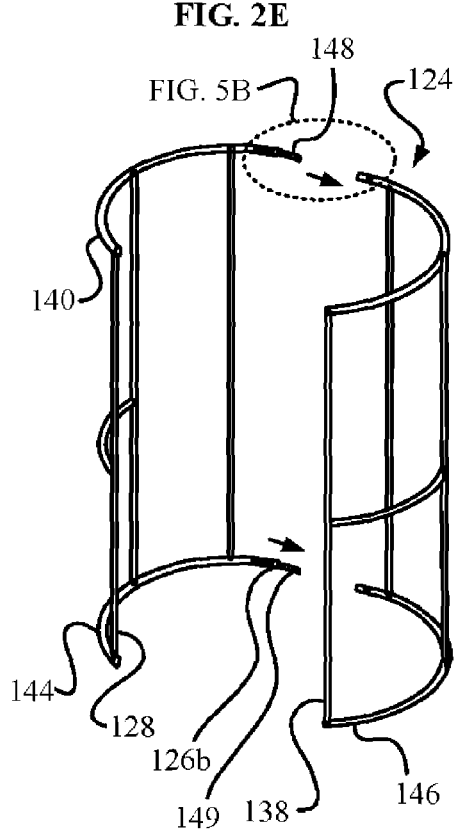
FIG. 2E is an exploded perspective view of the radiation shield support system of FIG. 2A.

FIG. 2B is a side view of the radiation shield support system 124 of FIG. 2A. FIG. 2C is a top view of the radiation shield support system 124 of FIG. 2A. FIG. 2D is a perspective view of the radiation shield support system 124 of FIG. 2A. FIG. 2E is an exploded perspective view of the radiation shield support system 124 of FIG. 2A showing a first and a second quick disconnect plug 148, 149 extending, respectively, from the first portion of the upper partial ring support 140 and the first portion of the lower partial ring support 144.

Figure 3A:
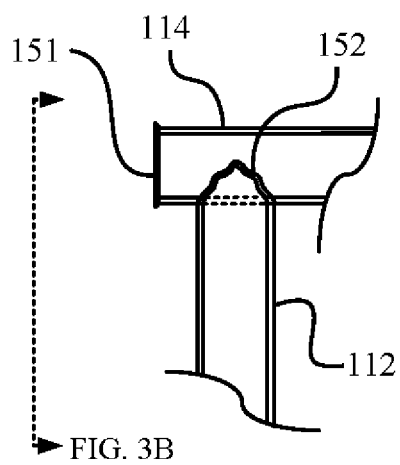
FIG. 3A is a detailed side view of one of the squared corner connectors of FIG. 1 illustrating a saddle weld.
Figure 3B:
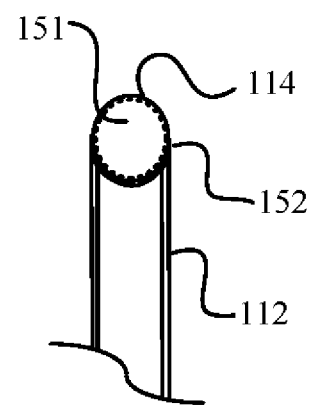
FIG. 3B is a detailed front view of the squared corner connectors of FIG. 3A.

FIG. 3A is a detailed side view of one of a plurality of squared corner connectors 150 of FIG. 1A illustrating a saddle weld 152 used to secure the fifth vertical support 112 to the upper partial ring support 114. Squared corner connect 150 may also include a pipe cap 151. FIG. 3B is a detailed front view of the squared corner connector 150 of FIG. 3A.

FIG. 4A is a front view of a third embodiment of a radiation shield support system 154 that includes a quick disconnect system, such as quick disconnect systems 126a and 126b, and a plurality of rounded corner connectors 156. The radiation shield support system 154 may be used for supporting one or more radiation shields 102 (see FIG. 1E). The system 154 may include a plurality of vertical supports, such as a first vertical support 158, a second vertical support 160, a third vertical support 162 (see FIG. 4D), a fourth vertical support 164 (see FIG. 2D), a fifth vertical support 166, and a sixth vertical support 168. The system 154 may also include a first portion of an upper partial ring support 170, a second portion of an upper partial ring support 172, a first portion of a lower partial ring support 174, and a second portion of a lower partial ring support 176. The system 154 may also include the first mid-horizontal support 129 and the second mid-horizontal support 139.

Figure 4C:
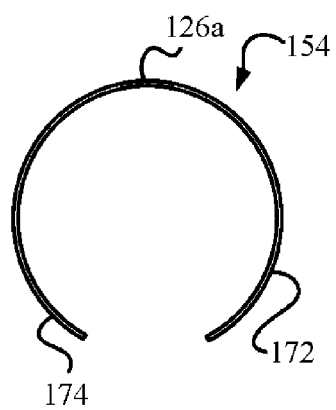
FIG. 4C is a top view of the radiation shield support system of FIG. 4A.
Figure 4D:
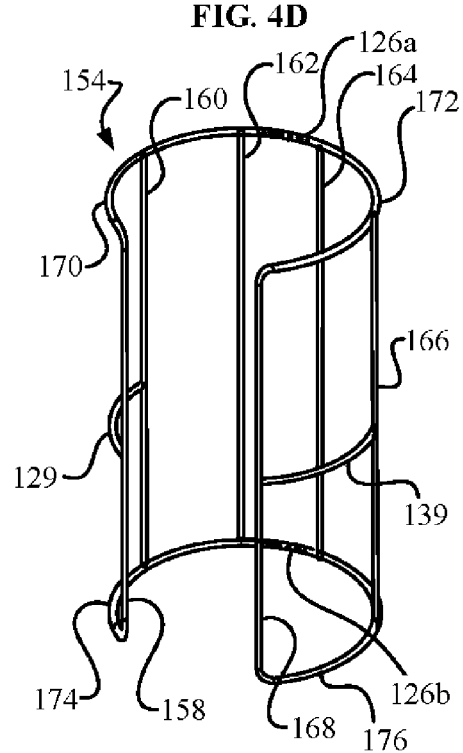
FIG. 4D is a perspective view of the radiation shield support system of FIG. 4A.

FIG. 4B is a side view of the radiation shield support system 154 of FIG. 4A. FIG. 4C is a top view of the radiation shield support system 154 of FIG. 4A. FIG. 4D is a perspective view of the radiation shield support system 154 of FIG.

Figure 4E:
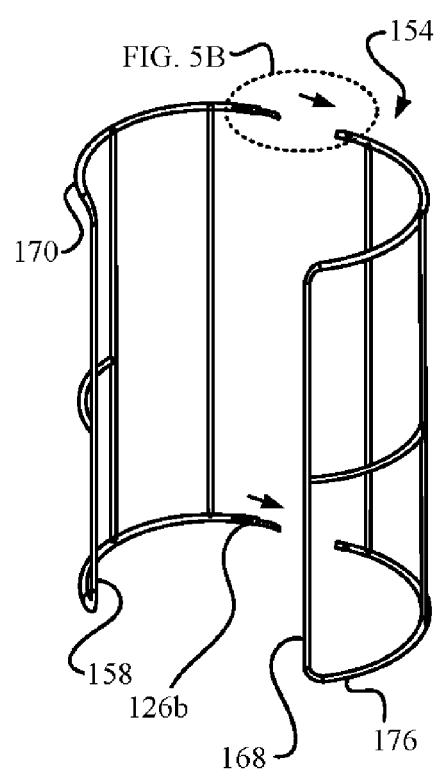
FIG. 4E is an exploded perspective view of the radiation shield support system of FIG. 4A.

4A. FIG. 4E is an exploded perspective view of the radiation shield support system 154 of FIG. 4A.

Figure 5A:
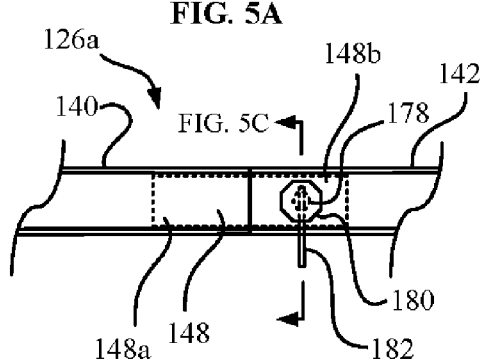
FIG. 5A is front view (from the perspective of FIG. 2A) of the quick disconnect of FIG. 2A.
Figure 5B:
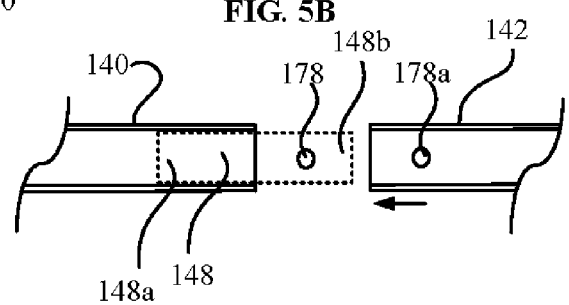
FIG. 5B is an exploded front view of the quick disconnect of FIG. 5A.
Figure 5C:
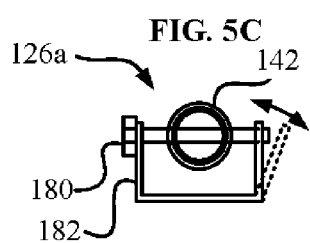
FIG. 5C is a side view of the quick disconnect of FIG. 5A.

FIG. 5A is front view (from the perspective of FIG. 2A) of the quick disconnect system 126*a* of FIG. 2A. The quick disconnect system 126*a* may include the first quick disconnect plug 148 having a plug hole or void 178 configured to removably accept a bolt 180. Bolt 180 may include a retaining/securing lock 182 that may retain bolt 180 in place when inserted into hole or void 178. Retaining/securing lock 182 may also be used to prevent bolt 180 from rolling in the event bolt 180 is dropped. A first end 148*a* of first disconnect plug 148 may be secured to the first portion of the upper partial ring support 140 in a number of manners, for example through a weld, while a second end 148*b* of first disconnect plug 148 may be removably secured to the second portion of the upper partial ring support 142 through bolt 180 and a ring hole or void 178*a*. FIG. 5B is an exploded front view of the quick disconnect 126*a* of FIG. 5A. FIG. 5C is a side view of the quick disconnect 126*a* of FIG. 5A. Though illustrated as bolt 180 with retaining/securing lock 182, those having skill in the art will recognize alternative means for providing a quick disconnect system, for example but not limited to, one or more bolts, wing nuts, etc.

In one embodiment, radiation shield support system, such as system 154, may be constructed in such a manner that: (a) the first portion of the upper partial ring 170 and the second portion of the upper partial ring 172 form a space 100*a* (see FIG. 1E) having an arc at approximately 19.25 inches from the center of the space 100*a*; (b) the height of the radiation shield support system 154 may be 48 to 72 inches; (c) the distance between vertical supports 158-160, 160-162, 162-164, 164-166, and 166-168 may be not more than 18 inches; (d) the distance between vertical supports 158-168 may be no more than 24 inches; (e) vertical supports 158, 160, 162, 164, 166, 168 and partial ring supports 170, 172, 174, and 176 are formed of 1.25 inch aluminum 6061-T6 pipe, ASTM 429 with allowable yield strength of 24,000 psi and Modulus of Elasticity of 10,100 ksi; and (f) disconnect plugs 148 and 149 are 1.25 inch diameter solid pipe sleeve—ALUM 6061-T6. Under such a construction, a radiation shield support system, such as system 154, may sustain vertical loads in excess of 11,243 pounds distributed over the radiation shield support system. However, radiation shield support system 154 may be designed to suit the workplace environment expected and is not limited to any particular dimensions or materials.

Figure 6A:
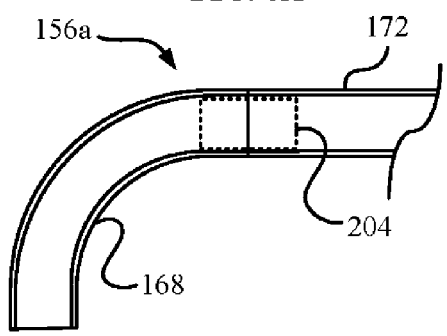
FIG. 6A is a detailed side view of a rounded corner connector that may be used in place of the squared corner connector of FIG. 3A.
Figure 6B:
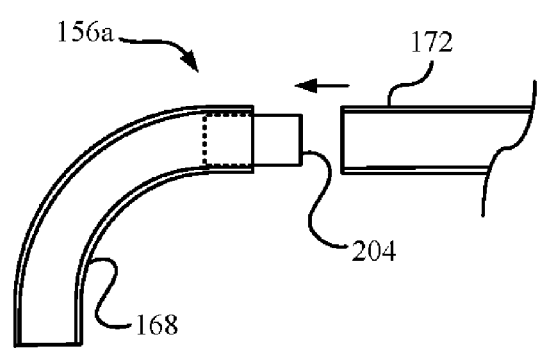
FIG. 6B is an exploded side view of the rounded corner connector of FIG. 6A.

FIG. 6A is in detail the side view of a rounded corner connector 156*a*, one of the plurality of rounded corner connectors 156, that may be used in place of the squared corner connector 150 of FIG. 3A. FIG. 6B is an exploded side view of the rounded corner connector 156*a* of FIG. 6A. The rounded corner connector 156*a* may include a corner plug 184. Plug 184 may be secured to sixth vertical support 168 and the second portion of the upper partial ring support 172 in a variety of manners, for example but not limited to, welding.

In a further embodiment, a radiation shield support system may include a first frame subassembly, a second frame assembly, and a quick disconnect. The first frame sub assembly may include, for example, upper partial ring support 140, lower partial ring support 144, and a plurality of vertical supports, such as supports 128, 130 and 132. The second frame sub assembly may include, for example, upper partial ring support 142, lower partial ring support 146, and a plurality of vertical supports, such as supports 134, 136 and 138. The second frame subassembly may have a ring hole, such as bolt hole or void 178. The quick disconnect, for example quick disconnect system 126*a*, may include a plug and a bolt, such as plug 148 and bolt 180.

In a still further embodiment, a radiation shield support system may include a first frame subassembly, a second frame assembly, a means for removably securing the first frame subassembly to the second frame subassembly, wherein the means for removably securing the first frame subassembly to the second frame subassembly may be, for example, one or more of the quick disconnect systems 126 *a* and 126*b*.

An embodiment of a method of supporting one or more radiation shields may include the steps of placing a first frame subassembly around an area in which reduced radiation exposure is desired, placing a second frame subassembly around the area in which reduced radiation exposure is desired, and removably securing the first frame subassembly to the second frame subassembly.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the appended claims.

The above description of the disclosed embodiments is provided to enable any person skilled in the art to make or use that which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings.

What is claimed is:

1. A system for supporting one or more radiation shields, the system comprising:
    a first frame subassembly, the first frame subassembly includes a first upper partial ring support and a first lower partial ring support;
    a second frame subassembly, the second frame subassembly having a first ring hole, a second upper partial ring support and a second lower partial ring support having a second ring hole;
    a first quick disconnect, the quick disconnect including a plug and a bolt, the plug having a plug hole; and
    a second quick disconnect, the second quick disconnect including a second plug and a second bolt, the second plug having a second plug hole;
    wherein the first ring hole is in the second upper partial ring support and the plug is permanently affixed to the first frame subassembly, and the bolt is configured to pass through the first ring hole and the plug hole in order to removably secure the first frame subassembly to the second frame subassembly, and
    wherein the second plug is permanently affixed to the first frame subassembly, and the second bolt is configured to pass through the second ring hole and the second plug hole in order to removably secure the first frame subassembly to the second frame subassembly.

2. The system of claim 1, further including a cover supported by the first upper partial ring support and the second upper partial ring support.

3. The system of claim 1, wherein one of the radiation shields is hung from the first frame assembly.

4. The system of claim 1, wherein the system is capable of supporting vertical loads in excess of 11,243 pounds distributed over the system.

\* \* \* \* \*